Aug. 25, 1953
B. W. JONES
2,650,341
VOLTAGE REGULATOR
Filed July 1, 1948
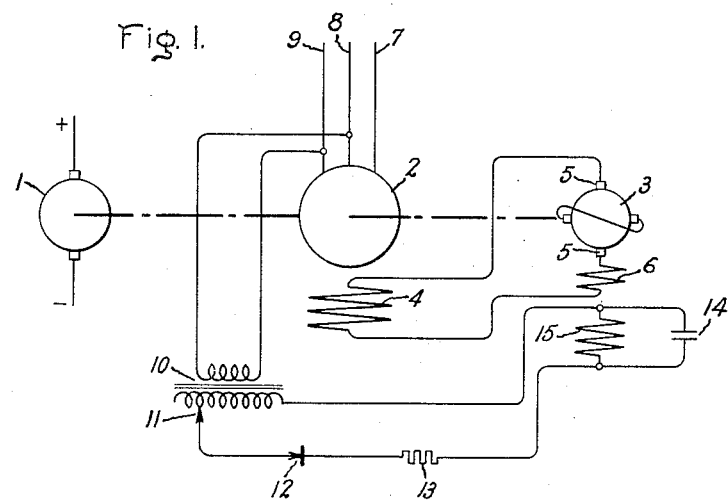
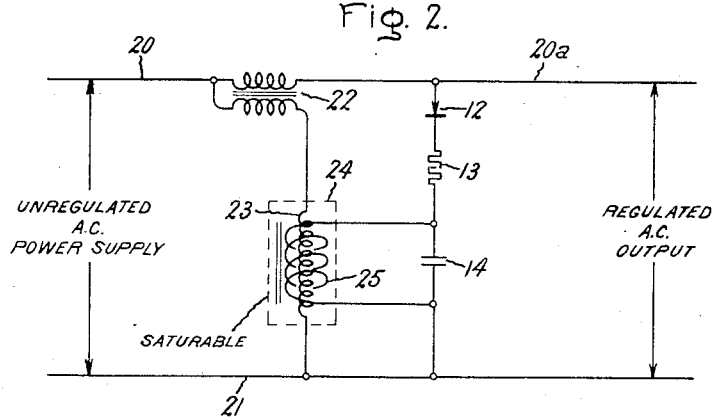
Inventor:
Benjamin W. Jones,
by Claude H. Mott
His Attorney.

Patented Aug. 25, 1953

2,650,341

UNITED STATES PATENT OFFICE 2,650,341

VOLTAGE REGULATOR

Benjamin W. Jones, Schenectady, N. Y., assignor to General Electric Company, a corporation of New York Application July 1, 1948, Serial No. 36,360

8 Claims. (Cl. 322—28)

My invention relates to voltage regulators, and more particularly to alternating current voltage regulators of the static type. It has for its general object the provision of a new and improved voltage regulator having no moving parts, but which is stable, sensitive and reliable in operation.

In accordance with my invention, I utilize as the regulating element of a regulating system a voltage responsive device, such as a germanium rectifier, having the property of rectifying up to a predetermined back crest voltage at which it ceases to rectify, and passes alternating current; but whose rectifying qualities are automatically and inherently restored when the applied voltage is reduced below the critical back crest value.

I subject such a rectifier or other voltage responsive device to a function of the output voltage of an alternating current source whose output voltage is to be regulated. The rectifier is connected in the system so that, as the system voltage increases below the critical breakdown voltage, the rectifier passes an increasing direct current which builds up the regulated voltage. When the system voltage reaches and exceeds the critical breakdown voltage of the rectifier, the rectifier passes alternating current, which reduces the regulated voltage. By so utilizing the breakdown characteristic of this rectifying element which is responsive to voltage variations of the voltage applied to said rectifier above and below a critical breakdown voltage, and which rectifies only when the applied voltage is below a predetermined voltage, I regulate, very accurately, the output of an alternating current power source.

My invention will be better understood from the following description taken in connection with the accompanying drawing, wherein Fig. 1 is a schematic circuit diagram of an alternator voltage regulating system embodying my invention, and Fig. 2 is a schematic circuit diagram of a supply line voltage regulator illustrating another embodiment of my invention. Elements that are the same in both figures have been given identical identifying numbers. The scope of my invention will be pointed out in the appended claims.

Referring now to the drawing, and in particular to Fig. 1, I have shown an electric motor 1 mechanically coupled to drive an alternator having an armature 2, and an amplidyne exciter having an armature 3. The amplidyne machine, its operation, characteristics, and advantages are fully described and claimed in Patent 2,227,992, granted July 7, 1941, to Ernst F. W. Alexanderson and Martin A. Edwards.

The alternating current generator, or alternator, is the source of the alternating current voltage to be controlled, and has a separately excited field exciting winding 4. The generator field winding 4 is connected for energization across the output terminals 5 of the amplidyne exciter in series with a series compensating field winding 6 of the amplidyne.

The alternator 2, 4 supplies a three-phase output voltage to three line conductors 7, 8 and 9. The voltage across the conductors 8 and 9 is supplied to the primary winding of a control transformer 10.

The secondary winding of transformer 10 is provided with a variable voltage tap 11, and is connected to supply current to a main amplidyne field exciting winding 15 which is in series with a stabilizing resistor 13 and a germanium crystal rectifier 12. A smoothing capacitor 14 is connected in parallel circuit relation with the main exciter field winding 15.

The foregoing circuit furnishes regulation by utilizing the characteristics of the voltage responsive device 12, which is responsive to voltage variations of applied voltage above and below a critical breakdown voltage, and which has the property of breaking down and failing to rectify when the voltage applied exceeds a predetermined critical crest breakdown voltage. When the applied voltage exceeds the breakdown voltage, this device will pass an alternating current until the applied voltage is lowered below the critical crest breakdown voltage, whereupon the device inherently and automatically begins again to rectify. A material having these properties is germanium, and preferably I use a germanium crystal rectifier such as the one fully described and claimed in a copending application, Serial No. 743,492 filed on April 24, 1947, by Harper Q. North and Margaret E. Kershaw, and assigned to the same assignee as the present application.

The operation of the circuit can best be understood by assuming motor 1 driving the alternator having an armature 2 and the amplidyne having an armature 3. Also assume that the output voltage of the alternator 2, 4, or any suitable function of this voltage which is supplied to the half wave rectifier 12, is below the breakdown voltage of this rectifier. In such case a pulsating direct energizing current is applied to the control field winding 15 for the production of magnetic flux thereby, for affecting the excitation of amplidyne 3. The magnitude of this current is substantially directly proportional to the alternator output voltage below the rectifier break-down voltage. This unidirectional exciting current is supplied to the amplidyne exciter control field winding 15 and the capacitor 14. The capacitor 14 serves as a smoothing capacitor and supplies current to the winding 15 during alternate half cycles when the rectifier 12 is not conducting.

Now as the output voltage rises, the direct current supplied to the main amplidyne control field 15 through the rectifier 12 also rises, thereby further to build up the output voltage. As soon as the output voltage increases beyond the regulated value, the crest breakdown voltage of rectifier 12 is reached and exceeded. Rectifier 12 then ceases to rectify. Alternating current is then supplied to the control field winding 15 of the amplidyne. Alternating current in the amplidyne exciter control field winding 15 causes a reduction in exciter output voltage, which in turn reduces the output voltage of the alternator.

When the alternator output voltage goes below the breakdown voltage of rectifier 12, it again begins to rectify. This causes the pulsating direct current to again be applied to control winding 15 of the amplidyne, increasing the current output thereof, and increasing the excitation of the alternator. This raises the output voltage of the alternator, and another cycle begins. In this manner operation is secured about the critical breakdown voltage of the rectifier in order to maintain the terminal voltage of generator 2, 4 at substantially a predetermined value, the critical breakdown voltage providing a regulating or operating point about which the rectifier or other voltage responsive device operates.

The variable tap 11 provides adjustment means whereby the control transformer secondary voltage can be maintained near the critical value of the rectifier over a range of alternator output voltage values. Regulation can therefore be obtained, within limits of the transformer, even though the output voltage to be controlled is not the same as the critical breakdown voltage of the rectifier. It is to be understood that a slide wire potentiometer or other similar voltage varying device could be used for this same purpose.

It will be readily understood by those skilled in the art that I could provide an additional direct current exciting generator in the series circuit between the amplidyne exciter and the alternator's separately excited winding. The additional direct current exciter would then be the primary excitation source and the amplidyne would be connected to buck or boost the output of said primary exciter, as desired, to effect the desired regulation.

Now referring to Figure 2, I show a pair of line conductors 20, 21 connected to an unregulated alternating current supply source, not shown. Connected in series in line 20 is the secondary winding of a boosting transformer 22 having output conductor 20a. The primary of this transformer is connected across the conductors 20 and 21 in series circuit relation with the alternating current winding 23 of a saturable reactor 24 to provide an induction regulator. A direct current saturating winding 25 of the saturable core reactor 24 is connected in series with stabilizing resistor 13 and germanium crystal rectifier 12 across the output conductors 20a, 21, the voltage of which is to be regulated. A smoothing capacitor 14 is connected across the saturating winding 25.

To best understand the operation of the circuit disclosed by Fig. 2, assume that the alternating current output voltage across rectifier 12 between the conductors 21 and 20a is just below the breakdown voltage of the rectifier. Rectifier 12, therefore, rectifies each alternate half cycle of the alternating voltage, and passes a pulsating direct current through the direct current saturating winding 25 of the saturable reactor 24, the capacitor 14 acting to smooth the current through the winding 25.

The direct current in saturating winding 25 saturates the core of the saturable reactor 24, thereby reducing the reactance of the alternating current winding 23. This reduces the alternating current voltage drop across alternating current coil 23 relative to the voltage drop across the primary winding of booster transformer 22. The consequent increase in voltage on the primary winding of the transformer 22 increases its output voltage and raises the voltage across the output conductors 20a—21.

In this manner the alternating current voltage between conductors 20a, 21 is raised until the critical breakdown voltage of the germanium rectifier 12 is exceeded. Rectifier 12 then breaks down and passes alternating current which is applied across condenser 14 and the saturating winding 25.

In the presence of alternating current through saturating coil 25, the core of the saturable reactor 24 is unsaturated so that the reactance of the alternating current coil 23 is greatly increased. This greatly increases the voltage drop across the coil 23 and reduces the voltage across the primary winding of the transformer 22. The secondary voltage of the transformer 22 is thus reduced so that the output line voltage is reduced below the breakdown voltage of said rectifier. The rectifier again begins to rectify, thereby causing pulsating direct current to be applied to saturating winding 25 and the condenser 14, and another regulating cycle begins. Thus, as in the circuit disclosed by Fig. 1, the alternating current voltage output will be regulated, since the voltage across germanium rectifier 12 will tend to hover on the critical breakdown voltage of the rectifier.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In a voltage regulating system for a source of alternating current supply, means including a flux producing winding for controlling the output voltage of said supply source, and means for controlling the energization of said flux producing winding in accordance with said output voltage, said last-mentioned means including a voltage responsive device having a critical voltage point about which it operates and having properties of rectification responsive to voltages below said critical voltage point and the ability to reacquire said properties of rectification when the voltage to which said voltage responsive device is subjected falls below said critical point.

2. In a condition regulating system for a source of alternating current supply, means including a flux producing winding for controlling said condition of said supply source, and means including a voltage responsive device having a critical voltage about which is operates for controlling the energization of said flux producing winding responsively to said condition, said voltage responsive device having the property of rectifying when the voltage applied thereto is below said critical voltage and passing alternating current when the applied voltage is above said critical voltage and having the ability to reacquire said property of rectifying when the voltage to which said voltage responsive device is subjected falls below said critical voltage.

3. In a voltage regulating system for a source of alternating current supply, means including a field exciting winding for controlling the output voltage of said supply source, and means including a germanium rectifier having a predetermined breakdown voltage about which it operates for controlling the energization of said field exciting winding in accordance with said output voltage, said rectifier rectifying below said predetermined breakdown voltage and passing alternating current above said breakdown voltage, and having the ability to reacquire the property of rectifying when the voltage to which said rectifier is subjected falls below said predetermined breakdown voltage.

4. In a voltage regulating system for a source of alternating current supply, means including a field exciting winding for controlling the output voltage of said supply source, a voltage responsive device having the characteristic of rectifying only when the applied voltage is below a predetermined voltage, said voltage responsive device operating about said predetermined voltage as a critical regulating point, and having the ability to reacquire said characteristic of rectifying when said applied voltage falls below said predetermined voltage, means for applying voltage to said voltage responsive device from said supply source, and circuit means for controlling the energization of said field winding by passing therethrough the output current of said voltage responsive device.

5. In combination, an alternating current generator having a separately excited field winding, a direct current exciter to energize said field winding, means to connect a function of the output voltage of said generator to a germanium crystal rectifier having the characteristic of rectifying up to a predetermined back crest voltage at which it ceases to rectify and passes alternating current, but which inherently begins again to rectify when the applied voltage is lowered below said crest voltage, said germanium rectifier operating about said predetermined back crest voltage as a critical regulating point, and means responsive to the direct and alternating output currents of said rectifier to vary the excitation of said field winding to regulate the voltage output of said generator.

6. In a voltage regulating system for a source of alternating current supply, means including induction means for controlling the magnitude of said source voltage, and means for controlling the energization of said induction means in accordance with the magnitude of said source voltage, said last-mentioned means including a voltage responsive device that breaks down when the applied voltage exceeds a predetermined critical back crest voltage, said critical voltage providing an operating point about which said voltage responsive device operates, said voltage responsive device rectifying at voltages below said crest voltage and passing alternating current at voltages above said crest voltage and having the ability to reacquire said rectifying property when said applied voltage falls below said predetermnied critical back crest voltage.

7. In a condition responsive regulating system for a source of alternating current supply, a rectifier device characteristically rectifying only when an alternating potential below a certain voltage is applied thereto, said device passing alternating current at potentials above said certain voltage and having the ability to reacquire said rectifying property when said applied alternating potential falls below said certain voltage, said certain voltage providing a critical point about which said rectifier device operates, means for applying to said device an alternating potential responsive to said condition of said source of alternating current supply, and electromagnetic means responsive to the output current of said rectifier device for regulating said source of alternating current supply to maintain said condition at a selected value corresponding to said certain rectifier voltage.

8. In a voltage regulating system for an alternating current supply, a germanium rectifier characteristically rectifying and passing unidirectional current only when an alternating potential below the crest breakdown voltage of said rectifier is applied thereto, said rectifier passing alternating current at voltages above said crest breakdown voltage but having the ability to reacquire said rectifying property when said applied alternating potential falls below said crest breakdown voltage, said crest breakdown voltage providing a critical point about which said rectifier operates, means for applying to said rectifier an alternating potential responsive to the voltage of said alternating current supply, and electromagnetic means responsive to the output current of said rectifier for regulating said alternating current supply to maintain the voltage thereof at a selected value corresponding to the crest breakdown voltage of said rectifier, said electromagnetic means providing reduced magnetic flux when the alternating potential applied to said rectifier is above said crest breakdown voltage and increased magnetic flux when the alternating potential applied to said rectifier is below said crest breakdown voltage.

BENJAMIN W. JONES.

References Cited in the file of this patent

UNITED STATES PATENTS

| Number | Name | Date |
|---|---|---|
| 2,247,166 | Edwards et al. | June 24, 1941 |
| 2,278,151 | Runaldue | Mar. 31, 1942 |
| 2,328,996 | Park | Sept. 7, 1943 |
| 2,395,246 | Bousky | Feb. 19, 1946 |

FOREIGN PATENTS

| Number | Country | Date |
|---|---|---|
| 746,047 | France | Feb. 27, 1933 |